Feb. 5, 1957

J. THEVENAZ 2,780,156

ACCESSORY ADAPTED TO BE SECURED TO
A CAMERA IN REMOVABLE MANNER

Filed Aug. 3, 1954

INVENTOR
Jean Thevenaz.

BY Emory L. Groff

ATTORNEY

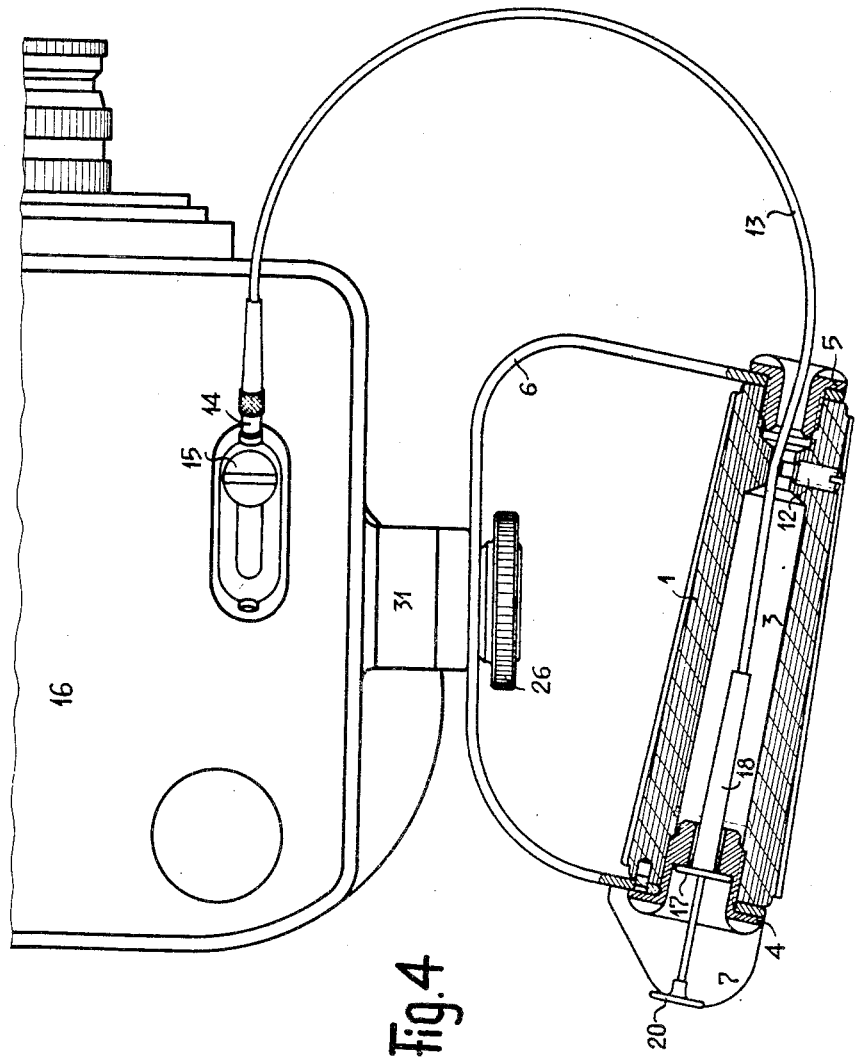

2,780,156

ACCESSORY ADAPTED TO BE SECURED TO A CAMERA IN REMOVABLE MANNER

Jean Thevenaz, Grandson, Switzerland, assignor to Paillard S. A., Sainte-Croix, Switzerland, a corporation of Switzerland Application August 3, 1954, Serial No. 447,535

Claims priority, application Switzerland August 11, 1953

2 Claims. (Cl. 95—86)

As is well known, some cameras, particularly those adapted for amateurs, are provided with a gripping belt or handpiece for enabling the operator to hold the camera more effectively when photographing, without the necessity of resorting to a stand or other analogous support.

Some manufacturers, desiring to render the gripping of the apparatus more comfortable and less tedious, have proposed the use of devices in the form of a handle, provided with a release mechanism adapted to act on the release device of the camera.

However, the devices known hitherto have the disadvantage of being capable of only being used in connection with a camera for which they have been constructed. On the other hand, the longitudinal axis of these devices is substantially vertical, which necessitates that the position of the forearm of the operator is substantially horizontal, thus producing an extremely awkward fatigue.

The present invention tends to remedy the above mentioned disadvantages. It has for its subject an accessory adapted to be secured, in a removable manner, to a camera provided for use with a release cable, so as to enable the camera to be held stable during photographing, said accessory comprising an elongated body forming a handle, secured to a support provided with means for enabling it to be secured to the said camera.

The accessory according to the invention is distinguished from similar known devices by the fact that the handle is provided with a longitudinal seating adapted to receive one end of the release cable of the camera.

One form of construction of the accessory according to the invention is shown diagrammatically and by way of example in the accompanying drawings, wherein:

Fig. 4 shows the accessory, with the release cable, secured to the camera (shown in part).

Figure 3:
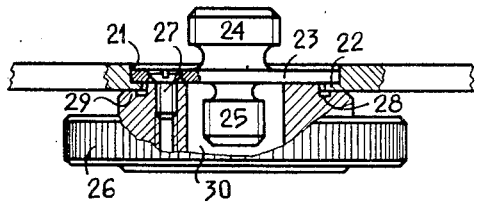
Fig. 3 shows to a larger scale, the means for securing the accessory to the apparatus.
Figure 2:
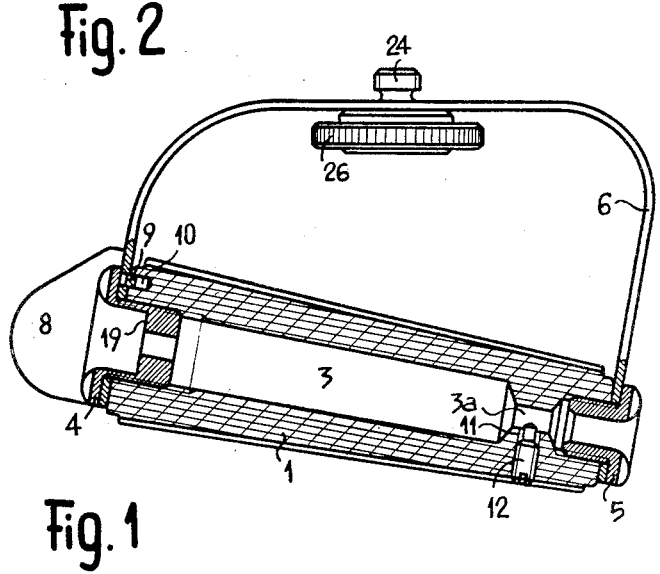
Fig. 2 is a side view with parts partly broken away or sectioned.

This accessory comprises an elongated body forming a handle 1, of conical shape and provided, on its surface, with grooves 2, the whole being such as to better conform with the shape of the hand of the operator and to facilitate gripping. The handle 1 comprises, along its longitudinal axis, a conical bore 3, of which the two ends are provided with a screw thread so as to enable two sockets 4, 5 to be screwed into the ends and by which the handle is secured to its support 6. The support is substantially of general U-shape and is provided, at each of its ends, with a circular opening receiving respectively the two sockets 4, 5, so as to enable the said handle to be secured to the said support 6. At one of its ends the support 6 is provided with two lugs 7 and 8, provided for guiding the thumb of the operator during release. Further, the said lugs prevent accidental release when the camera is set on a plane surface. In order to prevent angular movement of the handle relatively to the support, the latter is provided with a finger 9 which is provided for engagement with a blind hole 10 of the handle.

The handle is also provided with a threaded hole 11 adapted to receive a screw 12. Opposite the hole 11, the bore 3 is provided with a construction 3a.

As shown in Fig. 4, the release cable 13, of usual type, generally used with cameras, and particularly its end provided with the sleeve 18 in which slides the rod of the push button 20, is located in the handle support 1, after its end 14 has passed through the latter, the socket 4, the bore 3, 3a and the socket 5. The end 14 of the cable is provided for being secured to the release 15 of the camera 16. The holding of the cable in the position of use is effected by the part 17, secured to the sleeve 18, abutting against an abutment 19 provided in the socket 4. For preventing the cable from returning rearwardly, its sheath is secured to the handle by means of the screw 12.

The release is effected by acting with the thumb of the hand by which the operator holds the handle, on the push button 20 of the cable 13. The latter acts on the release of the camera and thus produces its release.

Fig. 3 shows, to a larger scale, the means for securing the accessory to the camera. The support 6 comprises a circular seating 21, against which bears a central portion 23 of a plug or dowel comprising, on each side of the central part 23, different screw threads 24, 25 respectively. At its central part 23, the plug is secured to the spindle of an operating knob 26 by means of screws 27. The said spindle of the knob 26 comprises a clearance 28 enabling it to turn freely in the interior of the shoulder 22. The said spindle is also provided with a shoulder 29 adapted to abut against the support 6, for preventing axial movement of the securing assembly formed by the plug and the knob. On the other hand, the axis of the knob comprises a recess 30 provided for receiving either one or other of the screw threads 24, 25 respectively, when the plug is secured to the knob. As shown, the plug may be secured to the knob in such a manner as to provide, for securing the accessory to the camera, by one or other of the screw threads 24, 25 respectively, the first being of "Congress" pitch and the second of "Kodak" pitch.

The assembly formed by the plug and the knob, described above, is capable of pivoting in the support 6 and thus enables the accessory to be secured to a camera.

Before proceeding with the securing, it is necessary to ensure that the screw thread of the plug, set for being secured, is that corresponding with the screw thread of the camera to be used. In the contrary case, the plug must be turned relatively to the knob 26. The securing of the accessory is effected by screwing the plug, by means of the knob 26, into the screwed boss 31 (see Fig. 4), with which each camera is generally provided at its underside portion thereof, for the purpose of securing it on a foot or other analogue support.

Figure 1:
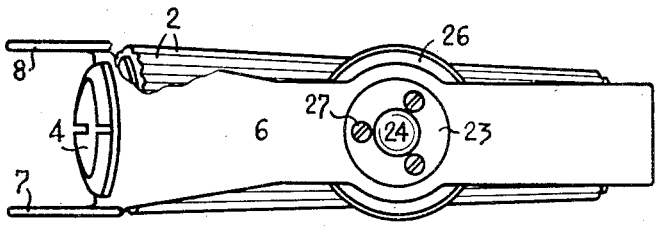
Fig. 1 is a top view (side of the camera).

As shown in the drawing (Figs. 1 and 4) the direction of the handle 1 forms an acute angle with the optical axis of the camera. This has the advantage of enabling the wrist and the hand of the operator to occupy their natural position when the forearm is held substantially vertical, the elbow being pressed against the body. Thus, a maximum stability is guaranteed for a minimum of fatigue.

The accessory above described thus enables a release cable of ordinary type to be used, and, consequently, may be used in connection with any type of camera. This is of considerable advantage as compared with similar known devices.

Further, the accessory enables the camera to be carried very easily and to be brought into the sighting position by a simple and natural upward movement of the forearm, without the necessity of changing the position of the hand by which the handle is held.

Further, the accessory described is of very simple construction. The handle is preferably constructed of moulded material which further reduces its already very reduced weight.

It will be understood that the shape of the support 6 and that of the handle itself, may be different from that shown.

In fact, the support 6, instead of being of U-shape, may be formed by a simple hook secured to the handle at only one of its ends.

The handle 1 itself may also be provided directly, at its central portion, with a dowel adapted to be screwed into the boss 31 of the camera.

In a further modification, the push button 20 of the release cable and the sleeve 3, instead of engaging with a bore of the handle 1, may be lodged in a groove provided either in the lower part or in the upper part of the handle. In this case, the sleeve 18 may be held firmly in the handle 1 for example by rings provided at the ends of the latter.

I claim:

1. A camera support and shutter release accessory adapted to be attached to the underside of a camera, comprising, in combination, an inverted U-shaped support member, means for securing said support to a camera at the underside portion thereof, said means being attached to the base portion of said U-shaped support member, said means including a dowel having two vertically threaded extensions, one at each end thereof, said vertically threaded extensions being separated by a central portion member thereof, an operating knob, said knob being operatively connected to and being pivoted in said base portion of said support, said central portion member of said dowel being operatively connected to said operating knob, a conically, substantially tubular shaped elongated handle secured to said U-shaped support, each of the ends of said handle being secured to the respective leg portion of said U-shaped support member at an end thereof, said handle having longitudinal grooves on the outer surface thereof, said handle being on a plane forming an acute angle with the plane of the axis of the camera lens, said handle having a longitudinal bore therethrough and a shutter release cable seating means at one end thereof for receiving one end of a shutter release cable, a shutter release cable operatively connected to the shutter of the camera lens and fixedly positioned in said handle bore, said cable having a sleeve member and a seating means attached to said sleeve member for positioning said cable at said shutter release cable seating means of said handle, a push button member operatively connected to said cable, and means fixedly attached to said U-shaped support member at the end of the leg thereof adjacent said push button for guiding the thumb of the photographer in pressing upon said push button to operate the camera lens shutter, whereby the wrist and the photographer's hand may both occupy their natural positions when the photographer's forearm is held substantially vertical while the photographer's elbow is pressed against his body, thereby insuring maximum stability for a minimum of fatigue, and whereby the stability of the camera during film exposure may be increased due to the ease with which the photographer may grip the handle while his arm is so held substantially vertical and his elbow is pressed against his body.

2. A camera support and shutter release accessory adapted to be attached to the underside of a camera, comprising, in combination, an inverted U-shaped support member, means for securing said support to a camera at the underside portion thereof, said means being attached to the base portion of said U-shaped support member, said means including a dowel having two vertically threaded extensions, one at each end thereof, said vertically threaded extensions being separated by a central portion member thereof, an operating knob, said knob being operatively connected to and being pivoted in said base portion of said support, said central portion member of said dowel being operatively connected to said operating knob, a conically, substantially tubular shaped elongated handle, said handle having a longitudinal bore therethrough, means for securing said handle at the respective ends thereof to the end of each leg member of said support member, said means including two socket members, each socket member being positioned through each leg, at the end thereof, and in a respective end portion of the said bore of said handle, one of said socket members having an abutment means for seating a shutter release cable, said handle having longitudinal grooves on the outer surface thereof, said handle being on a plane forming an acute angle with the plane of the axis of the camera lens, said latter socket member being on said plane of said handle nearer to the point at which said planes meet to form said angle than the said other socket, a shutter release cable operatively connected to the shutter of the camera lens and fixedly positioned in said handle bore, said cable having a sleeve member and a seating means attached thereto for engagement with said abutment, whereby said cable is positioned in said bore, a push button member operatively connected to said cable at that portion thereof adjacent to said socket abutment, and means fixedly attached to said U-shaped support member at the end of the leg thereof adjacent said push button for guiding the thumb of the photographer in pressing upon said push button to operate the camera lens shutter, said means including two spaced lug members, whereby the wrist and the photographer's hand may both occupy their natural positions when the photographer's forearm is held substantially vertical while the photographer's elbow is pressed against his body, thereby insuring maximum stability for a minimum of fatigue, and whereby the stability of the camera during film exposure may be increased due to the ease with which the photographer may grip the handle while his arm is so held substantially vertical and his elbow is pressed against his body.

References Cited in the file of this patent
UNITED STATES PATENTS

| Number | Name | Date |
| --- | --- | --- |
| 1,645,923 | Ohlau | Oct. 18, 1927 |
| 1,766,090 | Worsching | June 24, 1930 |
| 1,805,195 | Ramsey | May 12, 1931 |
| 2,498,137 | Ryder | Feb. 21, 1950 |